US 8,270,114 B2

(12) United States Patent
Argumedo et al.

(10) Patent No.: US 8,270,114 B2
(45) Date of Patent: Sep. 18, 2012

(54) MAGNETICALLY BIASED TILTING ROLLER BEARING TAPE GUIDANCE

(75) Inventors: Armando Jesus Argumedo, Tucson, AZ (US); Nhan Xuan Bui, Tucson, AZ (US); William Marvin Dyer, San Jose, CA (US); Reed Alan Hancock, Tucson, AZ (US); David Howard Flores Harper, Vail, AZ (US); Wayne Isami Imaino, San Jose, CA (US); Kevin Bruce Judd, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1259 days.

(21) Appl. No.: 12/028,649

(22) Filed: Feb. 8, 2008

(65) Prior Publication Data
US 2009/0201608 A1   Aug. 13, 2009

(51) Int. Cl.
*G11B 15/60* (2006.01)
(52) U.S. Cl. .................................... 360/130.21
(58) Field of Classification Search .............. 360/93, 360/95, 130.21; 242/346, 615, 615.2, 615.3, 242/615.4; 226/190, 191, 194, 196.1
See application file for complete search history.

(56) References Cited

U.S. PATENT DOCUMENTS

| | | | |
|---|---|---|---|
| 3,037,290 A | 6/1962 | Dolby | |
| 4,310,863 A | 1/1982 | Lelandais | |
| 4,427,166 A | 1/1984 | Oishi et al. | |
| 4,458,854 A | 7/1984 | Richard | |
| 4,466,582 A | 8/1984 | Shiba | |
| 4,509,031 A | 4/1985 | Sakata et al. | |
| 4,541,557 A | 9/1985 | Fell et al. | |
| 4,633,347 A | 12/1986 | Higgins | |
| 5,005,089 A | 4/1991 | Thanos et al. | |
| 5,172,282 A | 12/1992 | Ghose | |
| 5,434,732 A | 7/1995 | Schwarz et al. | |
| 5,447,279 A | 9/1995 | Janssen et al. | |
| 5,507,424 A | 4/1996 | Kitajima et al. | |
| 5,625,515 A | 4/1997 | Brown | |
| 5,726,834 A | 3/1998 | Eckberg et al. | |
| 5,731,935 A | 3/1998 | Lian et al. | |
| 5,788,137 A | 8/1998 | Ku | |

(Continued)

FOREIGN PATENT DOCUMENTS
JP    63222361 A2    9/1988

OTHER PUBLICATIONS

U.S. patent application entitled "Balanced Linkage Actuation of Tape Head", serial No. unknown, filed Jan. 29, 2008, by inventor D.H. Harper.

(Continued)

*Primary Examiner* — Craig A. Renner
*Assistant Examiner* — Gustavo Polo
(74) *Attorney, Agent, or Firm* — William K. Konrad; Konrad Raynes & Victor LLP (57) ABSTRACT

In one embodiment, a tape movement constraint for a tape drive system, comprises a tiltable tape roller bearing having a roller barrel biased in a first position on a pivot axis, using magnetic attraction between a movable magnet and a return path structure of magnetically permeable material. The roller barrel is pivoted on the pivot axis by conducting current through a fixed coil to generate a magnetic field which is conducted by the return path structure to interact with the magnetic field of the magnet. At least a portion of any air bearing between the moving tape and the barrel surface is quenched using grooves formed in the barrel surface. Other embodiments are described and claimed.

20 Claims, 7 Drawing Sheets

U.S. PATENT DOCUMENTS

| | | |
|---|---|---|
| 5,793,573 A | 8/1998 | Eckberg et al. |
| 5,798,885 A | 8/1998 | Saiki et al. |
| 5,949,619 A | 9/1999 | Eckberg et al. |
| 6,137,659 A | 10/2000 | Warmenhoven |
| 6,208,497 B1 | 3/2001 | Seale et al. |
| 6,467,669 B1 | 10/2002 | Okada |
| 6,754,033 B1 | 6/2004 | Argumedo et al. |
| 6,762,665 B1 | 7/2004 | Iwai et al. |
| 6,963,467 B2 | 11/2005 | Bui et al. |
| 7,054,101 B1 | 5/2006 | Marion et al. |
| 2003/0016467 A1 | 1/2003 | Bui et al. |
| 2005/0201017 A1 | 9/2005 | Koga et al. |

OTHER PUBLICATIONS

U.S. patent application entitled "Friction Engaged Tilting Roller Bearing Tape Guidance", serial No. unknown, filed Jan. 29, 2008, by inventors A.J. Argumedo, W. M. Dyer, W.I. Imaino and K.B. Judd.

U.S. patent application entitled "Moving Magnet Actuation of Tape Head", serial No. unknown, filed Jan. 29, 2008, by inventors N.X. Bui, R.A. Hancock, D.H. Harper, and W.I. Imaino.

MAGNETICALLY BIASED TILTING ROLLER BEARING TAPE GUIDANCE

FIELD

This description relates to tape drive systems for moving a tape, such as a recording tape for storing information, longitudinally across a head where the tape is subject to lateral movement.

BACKGROUND

Typically, tape drive systems provide tape guides for controlling the lateral movement of the tape as the tape is moved along a tape path in a longitudinal direction across a tape head. The tape may have a plurality of data tracks extending in the longitudinal direction, and the tape drive system may provide a track following servo system for moving the tape head in a lateral direction for following lateral movement of the longitudinal tracks as the tape is moved in the longitudinal direction. The track following servo system may employ servo tracks on the tape which are parallel to the data tracks, and employ servo read heads to read the servo tracks to detect position error and thereby position the tape head at the data tracks and follow the data tracks. This allows the data tracks to be placed closely together and increase the number of data tracks.

The tape is typically contained in a cartridge of one or two reels, and the tape is moved between a supply reel and a take up reel. The reels typically have runout causing the tape to move laterally as the tape is moved longitudinally. Tape guides can to an extent limit at least the amplitude of the lateral movement of the tape with the goal of limiting the lateral movement so that it does not exceed the lateral movement capability of the track following servo system.

In functions other than tape guiding, such as a tension roller (U.S. Pat. No. 4,310,863), an inertia roller (U.S. Pat. No. 4,633,347), or a tape timer roller (U.S. Pat. No. 3,037,290), where only longitudinal motion of the tape is concerned, high friction rollers that are in the tape path and displaced a considerable distance from the tape head, are intended to prevent or reduce tape slippage longitudinally with respect to the roller.

Typical tape guides may comprise stationary buttons or edges, or flanges at the side of tape guide rollers, positioned against the edges of the tape to control the amplitude of the lateral movement of the tape. In order to increase the total capacity of a tape, the tape is increasingly made thinner to allow more wraps of tape to fit on a given tape reel. As a result, the tape can be relatively weak in the lateral direction, and can, in some instances, be relatively easily damaged at the edge from the tape guide. Thus, the tape guides are typically positioned at a bearing where the tape assumes a cylindrical shape, thus increasing the ability of the tape edge to support a load. The tape roller bearing is generally rotatable about a central axis parallel to the cylindrical peripheral surface, allowing the tape freedom of movement in the longitudinal direction.

The bearing is also typically designed to have low friction. This arrangement can minimize the potential to distort the edge of the tape as the guides push against the edges of the tape to move the tape to the center of the bearing to reduce the amplitude of lateral displacement of the tape. One example is illustrated in U.S. Pat. No. 5,447,279, which employs an air bearing to reduce the friction of the bearing for stationary tape guides. One type of bearing in which the tape engagement surface remains stationary may also be referred to as a fixed pin or post. Other bearings such as roller bearings may have rotating tape engagement surfaces which reduce the longitudinal friction of the bearing while the flanges of the roller bearings push against the edges of the tape. One example of a roller bearing or fixed pin with flanges arranged to have low friction is U.S. Pat. No. 4,427,166. Fixed surfaces may also be arranged to have low friction. One example is described in U.S. Pat. No. 4,466,582, where a synthetic resin or metal coated tape guide bearing has a reduced contact area for the tape to lower the friction between the guide surface and the running tape and allow the flanges to stabilize the tape.

However, when wound on a reel, tape is typically subjected to stack shifts or stagger wraps, in which one wrap of the tape is substantially offset with respect to an adjacent wrap. Thus, as the tape is unwound from the reel, there can be a rapid lateral transient shift of the tape. Other common sources of rapid lateral transient shifts include 1) a buckled tape edge in which the tape crawls against a tape guide flange and suddenly shifts laterally back down onto the bearing, 2) a damaged edge of the tape which causes the tape to jump laterally when contacting a tape guide, and 3) when the take up reel or supply reel runout is so significant that the reel flange hits the edge of the tape.

Because of the low friction of the bearing and the low mass of the tape, rapid lateral transient shift of the tape at any point of the tape path may not be slowed by the typical tape guide and thus may be transmitted along the tape path to the tape head.

A tape head track following servo system may comprise a single actuator, or a compound, multiple element actuator. The transient response of the tape head track following servo system typically comprises a high bandwidth for a very limited lateral movement, called "fine" track following, to permit the tape head to follow small, relatively rapid displacements of the tape. Larger movement of the tape head is typically conducted as "coarse" track following, which is also employed to shift the tape head from one set of tracks to another set, and is typically conducted at a slow rate. The occurrence of a lateral transient shift, however, can be so rapid that neither the fine track follower nor the coarse track follower is able to respond, with the result that the tracking error becomes so large that writing may be stopped to prevent overwriting an adjacent track and to insure that the tracking error on read back is not so large as to cause a readback error.

One approach has been to make the tape guide edges or flanges closer together to maintain a pressure on both edges of the tape. However, this tends to stress and damage the edges of the tape, reducing its durability. An attempt at reducing the stress comprises spring loaded tape guides, such as the above-mentioned '279 patent. However, although the amplitude of the tape shift may be reduced somewhat by this approach, the speed of the shift is typically not reduced, and a track following servo error may still occur, reducing the performance of the tape drive.

U.S. Pat. No. 6,754,033 describes a tape roller bearing having a cylindrical peripheral surface comprising a grooved frictional surface for contacting and engaging the surface of the tape, allowing the tape to move freely with the tape roller bearing cylindrical peripheral surface in a direction perpendicular to the central axis, and constraining movement of the tape in the lateral direction. The frictional surface limits slip in the lateral direction, thereby reducing the rate of the lateral transient movement of the tape to allow the track following servo system to follow the reduced rate lateral transient movement of the longitudinal tracks.

Thus, the tape is contacted and engaged at its surface rather than at an edge, constraining the tape in the lateral direction, providing substantial lateral drag to the tape, such that the tape is able to move laterally at a slower rate as the tape roller bearing rotates, which can substantially reduce the rate of the lateral transient movement. The grooved tape engagement surface substantially quenches any potential air bearing that could form between the surface of the tape and the surface of the roller bearing, e.g., due to the air drawn along by the tape as it is moved rapidly. As a result, an air bearing beginning to form is generally collapsed to ensure that the roller bearing frictionally contacts and engages the surface of the tape. A flat cylindrical surface may also be provided at the edges of the tape to fully support the tape edges.

Another approach has been to provide rollers having a crowned tape engagement surface which exerts a lateral force on the tape which tends to restore the tape to a central position. However, the effectiveness of this approach can be limited due to various factors such as the Young's Modulus exhibited by the tape and the degree of strain permitted to be exerted on the tape.

Yet another approach utilizes a post having a concave tape engagement surface rather than a crowned tape engagement surface. Here too, the curvature can provide some restoring force to center the tape. However, like the crowned tape engagement surface, the concave curvature is limited by the allowable tension gradient in the tape. Typically, the tension gradient is maximum when the tape is at nominal tension and the edges are "baggy" or at zero tension.

It has also been proposed to use sensors to detect the lateral position of the tape edge as it passes the bearing and to tilt the bearing in an active closed control loop to control the lateral position of the tape. It is recognized that tilting the bearing can introduce a gradient of tension between the top and bottom edges of tape which can be used to actively steer the tape riding on an air bearing formed between the tape and the physical bearing surface. However, the air bearing may be inadvertently quenched such as when the tape stops or momentary stiction occurs between the tape and the physical bearing surface. As a consequence, a momentary loss of control of the tape may be produced which may have severe consequences causing damage to the tape.

SUMMARY

A tape movement constraint is provided for a tape drive system. In one embodiment, a roller barrel of a tiltable roller bearing is biased in a first position on a pivot axis relative to a base support frame, using magnetic attraction between a movable magnet and a return path structure of magnetically permeable material. The roller barrel is pivoted on the pivot axis relative to the base support frame by conducting current through a fixed coil to generate a magnetic field which is conducted by the return path structure to interact with the magnetic field of the magnet. The roller barrel pivots on the pivot axis as a function of the magnitude and direction of the current through the coil.

In the illustrated embodiment, the tiltable tape roller bearing of the constraint system is positioned along the tape path closely adjacent the tape head, has a cylindrical peripheral surface parallel to the lateral direction of the tape and extending a length greater than the width of the tape, for contacting a surface of the tape. The tape roller bearing is rotatable about a central axis parallel to the cylindrical peripheral surface, allowing the tape freedom of movement in the longitudinal direction.

The tiltable cylindrical peripheral surface comprises a frictional surface for contacting and engaging the surface of the tape, allowing the tape to move freely with the tape roller bearing cylindrical peripheral surface in a direction perpendicular to the central axis, and constraining movement of the tape in the lateral direction. The frictional surface limits slip in the lateral direction, thereby reducing the rate of the lateral transient movement of the tape to allow the track following servo system to follow the reduced rate lateral transient movement of the longitudinal tracks.

Thus, the tape is contacted and engaged at its surface rather than at an edge, constraining the tape in the lateral direction, providing substantial lateral drag to the tape, such that the tape is able to move laterally at a slower rate as the tape roller bearing rotates, substantially reducing the rate of the lateral transient movement. In one embodiment, any potential air bearing that could form between the surface of the tape and the surface of the roller bearing, e.g., due to the air drawn along by the tape as it is moved rapidly, is collapsed to insure that the roller bearing frictionally contacts and engages the surface of the tape.

The tape drive system moves the tape along a tape path in a longitudinal direction across a tape head, the tape having tracks extending in the longitudinal direction, the tape head having a track following servo system for moving the head in a lateral direction for following lateral movement of the longitudinal tracks, where the tape is subject to lateral transient movement.

Other embodiments are described and claimed.

BRIEF DESCRIPTION OF THE DRAWINGS

For a fuller understanding of the present description, reference should be made to the following detailed description taken in conjunction with the accompanying drawings.

FIG. 5a is an isometric view, illustrating one embodiment of an actuator for the tiltable roller bearing of FIG. 4a;

DETAILED DESCRIPTION

In the following description with reference to the Figures, like numbers represent the same or similar elements. It will be appreciated by those skilled in the art that variations may be accomplished in view of these teachings without deviating from the spirit or scope of the present description.

Figure 1:
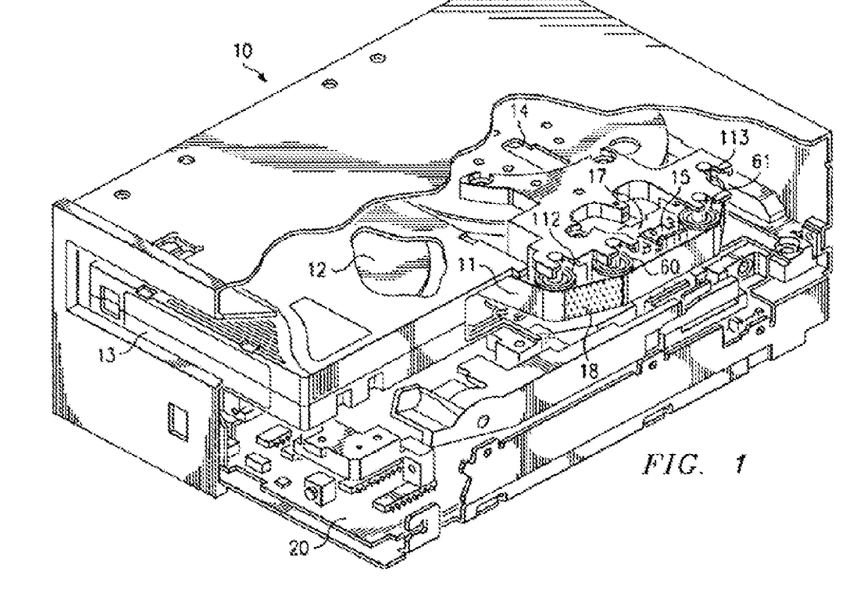
FIG. 1 is a partially cut away perspective view of a tape drive in accordance with one embodiment of the present description.

Referring to FIG. 1, a tape drive 10, such as a magnetic tape drive, in accordance with one aspect of the present description, is illustrated. A magnetic tape 11 is moved along a tape path from a supply reel 12 in a magnetic cartridge 13 to a take up reel 14, the reels comprising drive reels of a drive system operated by drive motors. The magnetic tape is moved along the tape path in a longitudinal direction across a tape head 15. The tape head is supported by an actuator 17 of a servo system, which, for example, may comprise a compound actuator. The tape head 15, for example, a magnetic tape head, may comprise a plurality of read and write elements and a plurality of servo read elements. The tape may comprise a plurality of servo tracks or bands 18 which are recorded on the tape in the longitudinal direction on the tape and are parallel to the data tracks. The servo read elements are part of a track following servo system for moving the tape head 15 in a lateral direction for following lateral movement of the longitudinal tracks as the tape 11 is moved in the longitudinal direction, and thereby position the tape head at the data tracks and follow the data tracks.

The compound actuator may comprise a coarse actuator, such as a stepper motor, and a fine actuator, such as a voice coil, mounted on the coarse actuator. The fine actuator in this embodiment has a high bandwidth for a very limited lateral movement, called "fine" track following, for allowing the tape head to accurately follow small displacements of the tape. Larger movement of the tape head is in this embodiment conducted by the coarse actuator for centering the actuator at the average position of the fine actuator during track following, and is also employed to shift the tape head from one set of tracks to another set, and is conducted at a slow rate. An example of a compound actuator is described in coassigned U.S. Pat. No. 5,793,573. It is appreciated that many differing types of actuators may be employed in embodiments of the present description, depending upon the particular application.

The tape drive 10 additionally comprises a controller 20 which provides the electronics modules and processor to implement a servo system to operate the compound actuator. In addition, the controller 20 provides the electronics modules and processor portion of the tape movement constraint described below.

The magnetic tape 11 of the present example may be provided in a tape cartridge or cassette 13 having a supply reel 12 or having both the supply and take up reels. The servo tracks or bands 18 may comprise any of several types of longitudinal servo patterns as is known to those of skill in the art. For example, a timing based servo pattern is described in coassigned U.S. Pat. No. 5,689,384, and comprises magnetic transitions recorded at more than one azimuthal orientation across the width of the servo track. In one example, five longitudinal timing based servo tracks are prerecorded on the magnetic tape for track following at these positions. The pattern of magnetic transitions recorded in the servo tracks is a repeated set of frames, each of which are of different azimuthal orientations. Thus, the tape head 15 may comprise at least two narrow servo read elements allowing two servo tracks to be sensed simultaneously, and the outputs used redundantly to reduce error rates.

In this example, the magnetic tape 11 may also be provided with suitable guard bands at the edges of the tape, and four data track regions between the servo tracks. A plurality of read and write elements may be provided at the tape head 15 for reading and/or writing data on the tape 11. When the servo elements are properly positioned at the specific servo tracks, the read and write elements are properly positioned to transfer data with respect to the corresponding data track locations of the tape 11.

The data tracks are typically narrow and closely spaced, and the tape 11 is typically very thin with little lateral stiffness at the edge. Tape edge guides may be provided which push against the edge of the tape to prevent excessive lateral movement of the tape, for example, from runout of the supply reel 12 or the take up reel 14, at least from the standpoint of the amplitude of the movement of the tape. However, when wound on a reel, tape is typically subjected to rapid lateral transient shifting, for example, from stack shifts or stagger wraps, in which one wrap of the tape is substantially offset with respect to an adjacent wrap. Other common sources of rapid lateral transient shifts include 1) a buckled tape edge in which the tape crawls against a tape guide flange and suddenly shifts laterally back down onto the bearing, 2) a damaged edge of the tape which causes the tape to jump laterally when contacting a tape guide, and 3) when the take up reel or supply reel runout is so significant that the reel flange hits the edge of the tape.

In the tape drive 10 of FIG. 1, a tape movement constraint in accordance with one embodiment of the present description, comprises at least one tape roller bearing 60, 61 for positioning the tape 11 along the tape path closely adjacent the tape head 15. Each tape roller bearing 60, 61 has a generally cylindrical peripheral surface 200 (FIG. 2) parallel to the lateral direction of the tape 11 (FIG. 1) and extending a height or length L (FIG. 3a) greater than the width of the tape 11, for contacting a surface of the tape 11. In the illustrated embodiment, the height L of the barrel is chosen to be 16 mm to comfortably handle possible lateral excursions of a half-inch (12.7 mm) wide tape 11. It is appreciated that other dimensions may be selected depending upon the particular application. Each tape roller bearing 60, 61 is rotatable about a central axis 210, parallel to the cylindrical peripheral tape engagement surface 200, allowing the tape freedom of movement in the longitudinal direction and also countering stiction.

Figure 2:
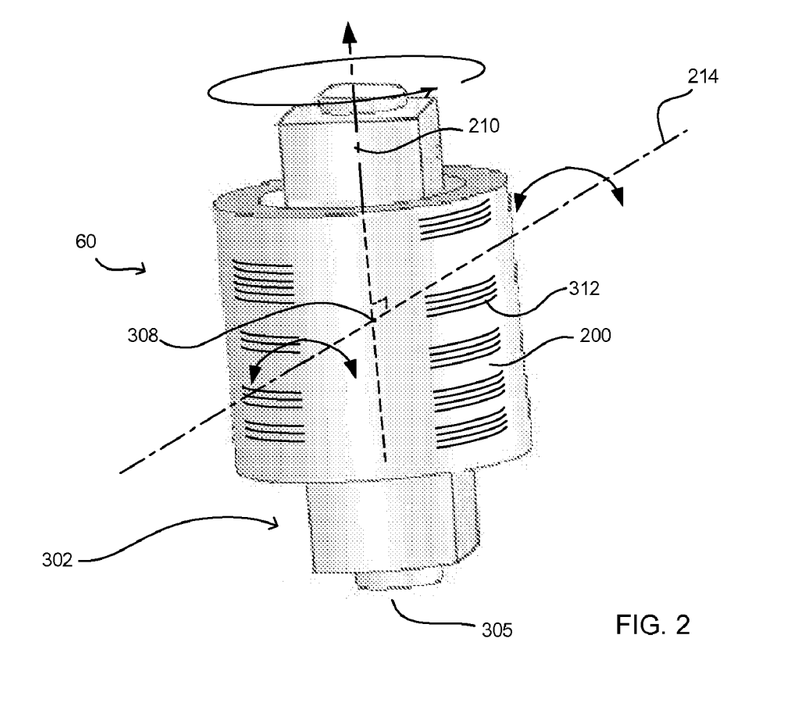
FIG. 2 is an isometric view, illustrating one embodiment of a tiltable roller bearing in accordance with the present description, which may be employed in the tape drive of FIG. 1.

The tape engagement surface 200 of each tape roller bearing 60, 61 is tiltable to control the lateral position of the moving tape. In the illustrated embodiment, the tape engagement surface 200 of each tape roller bearing 60, 61 is tiltable about an axis, such as the axis 214, for example, which, in this embodiment, is generally orthogonal to the axis 210 of rotation of the tape roller bearing 60, 61. As explained in greater detail below, the tilt of the roller bearing 60, 61 may be controlled by a novel actuator to counteract lateral movements of the tape. As a consequence, the rate of the lateral transient movement of the tape may be reduced so that the track following system may continue to track follow the longitudinal tracks of the tape. It is appreciated that in other applications, features other than reduction of lateral transient movement may be achieved, depending upon the particular application.

In one embodiment, tape roller bearings 60 and 61 may be located within a removable cartridge, for example, replacing the stationary bearings in an IBM 3570 tape cartridge, for example. When the cartridge is placed in the drive, the tape roller bearings 60 and 61 are positioned along the tape path, and closely adjacent the tape head 15. Elements 112 and 113 may comprise conventional tape guides for reducing the amplitudes of the lateral transient movement, or may comprise additional tape movement constraint roller bearings. It is appreciated that the tape roller bearings of the constraint may be positioned outside a cartridge or elsewhere with respect to the tape head, depending upon the particular application.

Figures 3A, 3B:
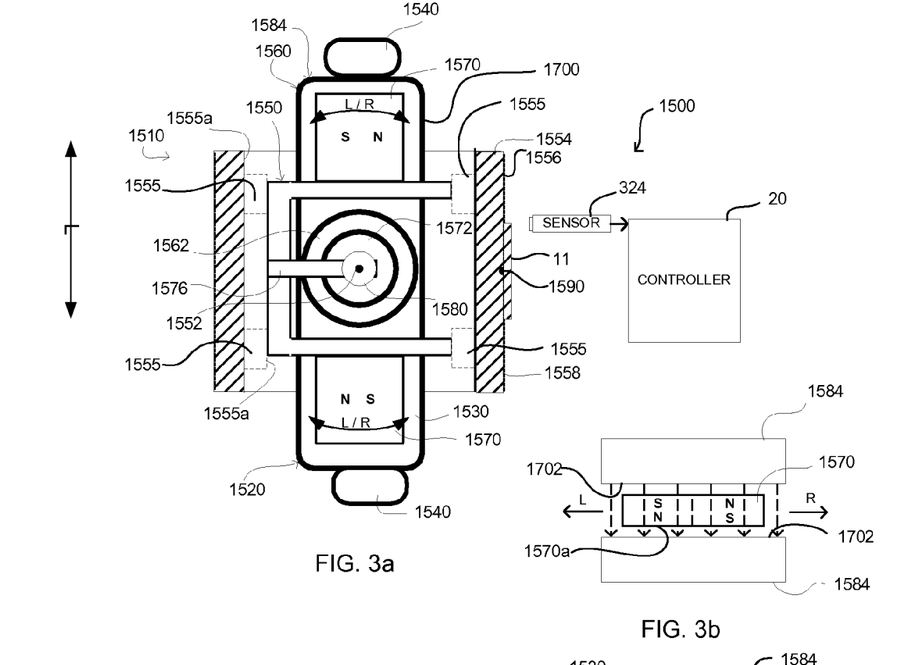
FIG. 3a is a side schematic diagram of an embodiment of a constraint system in accordance with the present description, which may be employed in the tape drive of FIG. 1.
FIG. 3b is a top, schematic view of one embodiment of the interaction of permanent magnets and a magnetic return path structure in an actuator of a tiltable roller bearing in accordance with the present description.
Figure 4A:
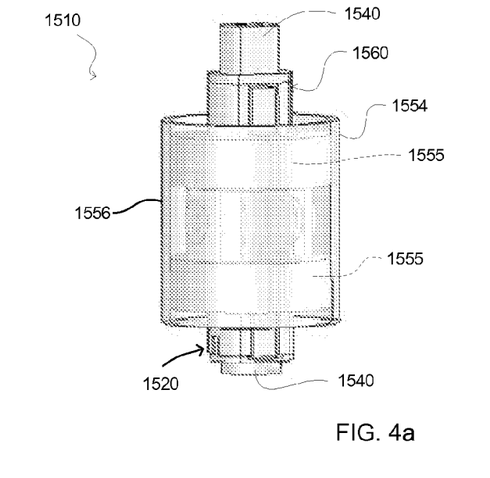
FIG. 4a is an isometric view, illustrating an embodiment of a tiltable roller bearing of the constraint system illustrated in FIG. 3a, in accordance with the present description, which may be employed in the tape drive of FIG. 1.
Figure 4B:
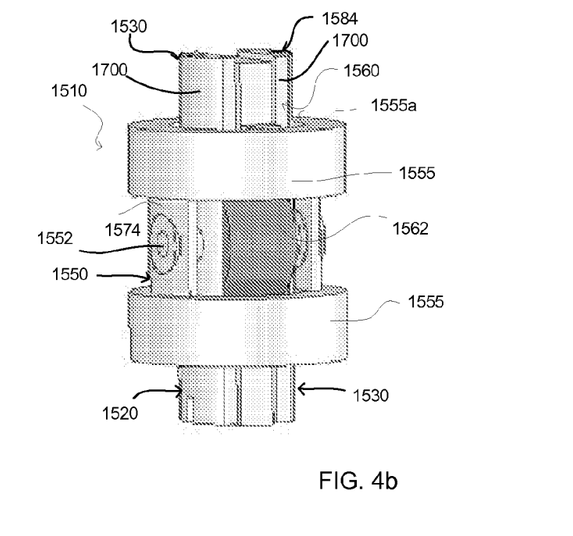
FIG. 4b is an isometric view, illustrating the tiltable roller bearing of FIG. 4a, depicted with the roller barrel omitted for clarity.

FIG. 3*a* is a schematic diagram of one example of a tape movement constraint 1500 including a tiltable roller bearing 1510, for a tape drive system such as the tape drive system 10 of FIG. 1. FIGS. 4*a* and 4*b* are full assembly and partial assembly views, respectively, of one example of a physical embodiment of the tape roller bearing 1510 depicted in schematic form in FIG. 3*a*. The tape movement constraint 1500 including tape roller bearings 1510 may be employed in the tape drive 10 of FIG. 1, in the same manner as the roller bearings 60, 61 described above.

As explained in greater detail below, in one embodiment, the roller bearing 1510 is biased in a first position on a pivot axis relative to a base support frame, using magnetic attraction between a movable magnet and a return path structure of magnetically permeable material. The roller barrel 1510 is pivoted on the pivot axis relative to the base support frame by conducting current through a fixed coil to generate a magnetic field which is conducted by the return path structure to interact with the magnetic field of the magnet. The roller barrel pivots on the pivot axis as a function of the magnitude and direction of the current through the coil.

Accordingly, in this example, the tape roller bearing 1510 has a base 1520 which has a fixed, first support frame 1530. As best seen in FIG. 4*a*, mounting caps 1540 at the top and bottom, respectively, of the first support frame 1530 may be used to locate and fasten the tilting roller bearing 1510 to the drive 10.

A second support frame 1550 is pivotally coupled at a pivot 1552 to the fixed first support frame. A tape roller barrel 1554 of the tape roller bearing 1510 is rotatably supported by roller bearing tracks 1555 (FIG. 4*b*) disposed around the second support frame 1550. The roller barrel 1554 is positioned along a tape path, and in this example, the surface 1556 of the roller barrel 1554 defines a plurality of grooves 1558, so that the surface 1556 is adapted to contact and engage the surface of the tape 11 as the roller barrel 1554 rotates. A variety of grooves are suitable in the surface 1556 as shown by FIGS. 9*a*-14*b*, for example. The roller barrel 1554 is omitted from the view of FIG. 4*b* for clarity.

The roller bearing 1510 includes an actuator 1560 coupled to both the first support frame 1530 and the second support frame 1550 and is adapted to pivot the second support frame and the roller barrel 1554 at the pivot 1552 relative to the first support frame 1530 when the actuator 1560 is actuated. In the illustrated embodiment, the actuator 1560 is a voice coil actuator. It is appreciated that other types of actuators may be used, depending upon the particular application.

The tape movement constraint 1500 further includes a tape position sensor 324 positioned to detect the lateral position of the tape 11. The controller 20, responsive to the tape position sensor 324 is adapted to control the actuator 1560 to tilt the roller barrel 1554 on the pivot axis 214 to control the lateral position of the tape 11 in response to the tape position sensor 324.

Figure 5A:
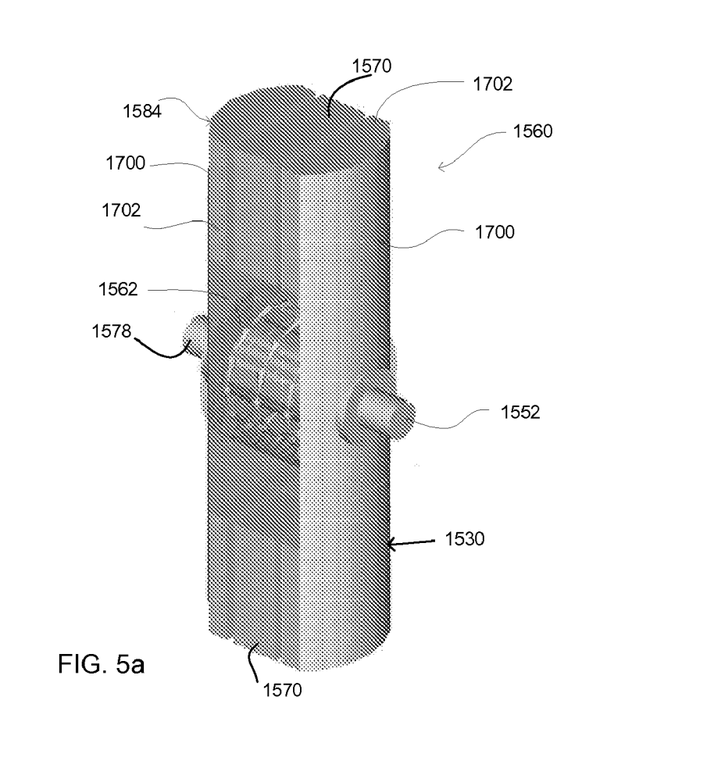
Figure 5B:
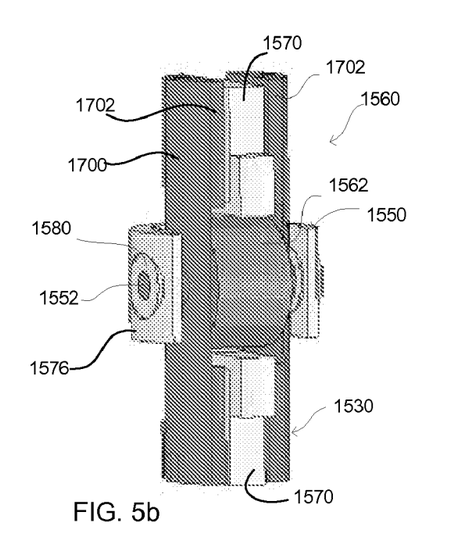
FIG. 5b is an isometric view, illustrating the actuator of FIG. 5a with a second support structure which includes a magnet holder.
Figure 5C:
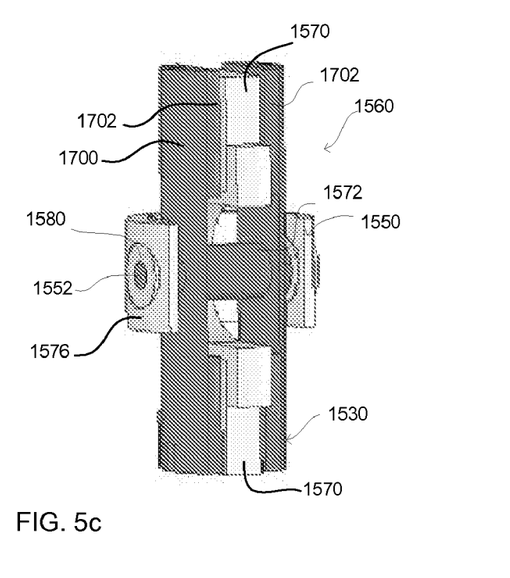
FIG. 5c is an isometric view, illustrating the actuator and second support structure of FIG. 5b, with the coil omitted for clarity.

In the illustrated embodiment, and as best seen in FIGS. 5*a*, 5*b* and 5*c*, the voice coil actuator 1560 includes a coil 1562 which is adapted to conduct an electric current to generate a magnetic field. The actuator 1560 further comprises at least one permanent magnet 1570. In the illustrated embodiment of FIGS. 3*a*, 3*b*, 4*a*, 4*b*, 5*a*, 5*b*, 5*c* and 6*a*-19*d*, coil 1562 of the actuator 1560, is fixed rather than movable. As best seen in FIGS. 5*b*, 5*c*, the coil 1562 (FIG. 5*b*) is supported by a coil holder 1572 (FIG. 5*c*) of the first support frame 1530. It is believed that a fixed coil can reduce or eliminate wire breakage that can occur with a moving coil.

Conversely, in the illustrated embodiment of FIGS. 3*a*, 3*b*, 4*a*, 4*b*, 5*a*, 5*b*, 5*c* and 6*a*-19*d*, a set of magnets 1570 of the actuator 1560, is movable rather than fixed. As best seen in FIGS. 6*a*-6*d*, in the illustrated embodiment, the magnets 1570 are supported by the pivoting second support frame 1550 which includes a first U-shaped magnet holder 1574 which extends around the coil 1562. The magnet holder 1574 is connected by a second U-shaped swing arm 1576 to a pivot pin 1552 (FIG. 5*a*) of the first support frame 1530. In the illustrated embodiment, the swing arm 1576 is affixed to the magnet holder 1574 orthogonal to the magnet holder 1574. Ball bearing tracks 1580 between the pivot pin 1552 and the second U-shaped swing arm 1576 facilitate the swing arm 1576 and hence, the magnet holder 1574 and the magnets 1570, pivoting about the pivot point 1552.

The actuator 1560 further includes a magnetic return path structure 1584 positioned adjacent the coil 1562 to conduct the magnetic field generated by the coil 1562. The magnetic return structure 1584 is, in the illustrated embodiment, a part of the first support frame 1530, and, as best seen in FIGS. 5*a*, 5*b*, 5*c*, includes a pair of parallel return members 1700, each of which has an extension plate 1702 extending from each end. The magnetic return structure 1584 further includes a core 1572 (FIG. 5*c*) around which the coil 1562 is wound. The core 1562 also functions as the coil holder as described above. The coil core 1572 of the return path structure 1584 connects the centers of the parallel return members 1700. The magnetic return path structure 1584 is made of a ferromagnetic material such as nickel, iron, steel or suitable magnetically permeable materials. It is believed that the maximum current through the coil 1562 can be increased due to good thermal contact between the coil 1562 and the rest of the actuator structure including the magnetic return path structure 1584.

The second U-shaped swing arm 1576 extends around the magnetic return structure 1584 and is rotatably journaled to the pivot pins 1552 (FIG. 5*a*) extending from the magnetic return path structure 1584. As best shown in FIGS. 3*a*, 4*a*, 4*b*, the tape roller barrel 1554 (FIG. 4*a*) of the tape roller bearing 1510 is rotatably supported by two spaced apart roller bearing tracks 1555 (FIG. 4*b*), each of which is affixed to an end of the pivoting magnet holder 1574 of the second support frame

1550. As best seen in FIGS. 3a, 4b, each roller bearing track 1555 defines an interior opening 1555a through which the parallel return members 1700 of the return path structure 1584 extend.

The roller bearing tracks 1555 in turn engage the internal surface of the roller barrel 1554, wherein the roller barrel 1554 is adapted to rotate on the roller bearing tracks 1555 around the magnet holder 1574 of the second support frame 1550. In the illustrated embodiment, the roller bearing tracks 1555 may include ball bearings, an air bearing, or other suitable bearings.

In the illustrated embodiment, the roller bearing tracks 1555 are angular contact or deep groove ball bearings, preloaded against each other to permit smooth rolling motion of the barrel 1554. In that there is little or no relative motion of the tape with respect to the roller in this embodiment, the tape movement constraint 1500 can facilitate control of high frequency excitation of lateral motion of the tape 11. Accordingly, such control may be facilitated if the bearing tracks 1555 have relatively little radial and axial runout. However, it is appreciated that other types of bearings may be used, depending upon the particular application.

Figure 6A:
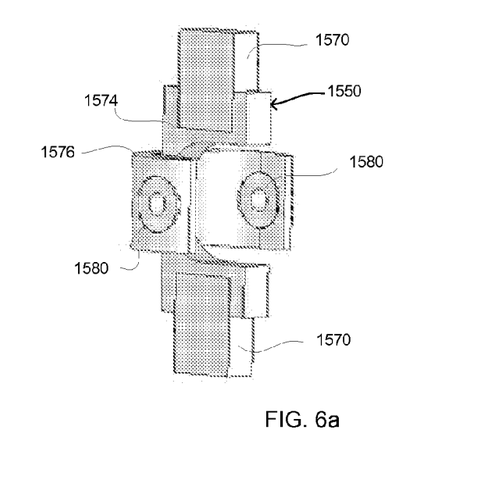
FIG. 6a is an isometric view, illustrating the second support structure of FIG. 5c together with the magnets of the actuator.
Figure 6B:
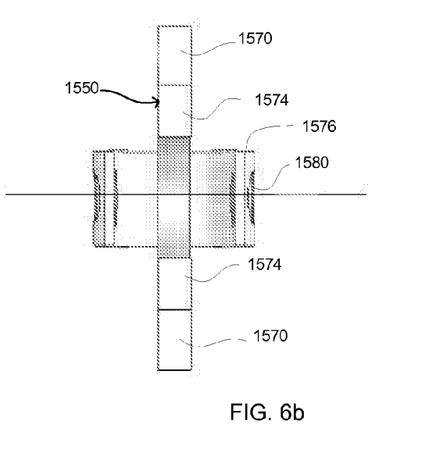
FIG. 6b is a front view, illustrating the second support structure of FIG. 5c together with the magnets of the actuator.
Figure 6C:
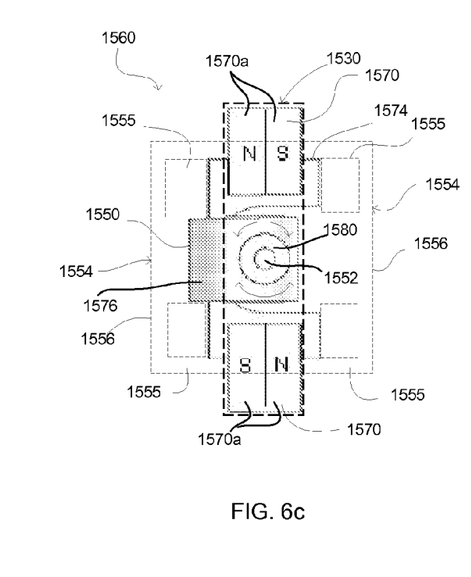
FIG. 6c is a side view, illustrating the second support structure of FIG. 5c together with the magnets of the actuator, in a first, untilted position with respect to the roller barrel and magnetic return path structure which are shown in phantom.
Figure 6D:
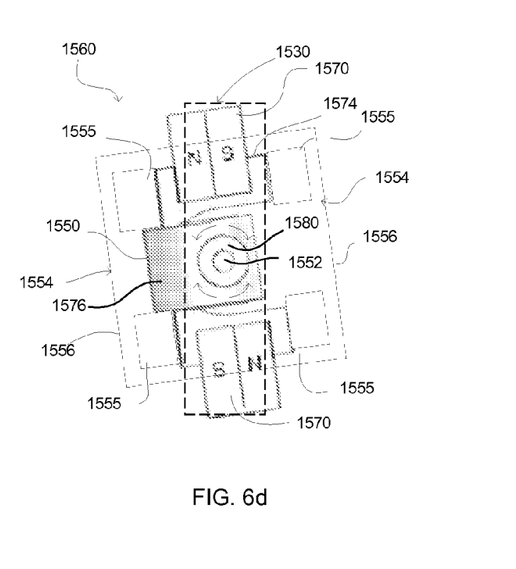
FIG. 6d is a side view, illustrating the second support structure of FIG. 5c together with the magnets of the actuator, in a second, tilted position with respect to the roller barrel and magnetic return path structure which are shown in phantom.

As best shown in the top schematic view of FIG. 3b, and the physical embodiment views of FIGS. 5a-6d, the permanent magnets 1570 supported by the magnet holder 1574 of the second support frame 1550 are each positioned between and facing the extension plates 1702 of the return path structure 1584. As best seen in FIG. 5b, 6c, magnetic attraction between the magnets 1570 and the return path structure 1584 biases the magnets 1570 and hence, the second support frame 1550 and the roller barrel 1554 in a first, nontilted position relative to the return path structure 1584 of the first support frame 1530. Conversely, to tilt the roller barrel 1554, the controller 20 causes current to be conducted through the coil 1562 which generates a magnetic field which is conducted by the return path structure 1584 to interact with the magnetic fields of the magnets 1570 as shown in FIG. 3b. This magnetic field interaction causes the magnets 1570 and hence, the second support frame 1550 and the roller barrel 1554 to pivot on pivot 1552 relative to the return path structure 1584 of the first support frame 1530, as a function of the magnitude and direction of the current through the coil 1562 as shown in FIG. 6d.

Thus, current through the coil 1562 produces a magnetic field normal to the wires of the coil 1562. The coil generated magnetic field is directed by the return path structure 1584 to be normal to the plane of FIG. 3a and parallel and antiparallel to the magnetic fields of the magnets 1570, the magnetic polarities of which are arranged to alternate as shown in FIGS. 3b and 6c-d. Thus, the fixed coil 1562 produces a flux which, depending on the current direction adds to or subtracts from the field due to the magnets 1570 alone.

In the illustrated embodiment, the faces 1570a of the magnets 1570 are magnetically polarized oppositely by halves as shown. Thus, the flux from the coil 1562, through the return path structure 1584, increases the field of one half of the magnet 1570 and decreases the field of the other half. This changes the magnetic energy in the air gap field. As a result, the gradient of the magnetic energy becomes non-zero and a force is generated. It is appreciated that the magnetic polarizations may be achieved using a variety of techniques including fabricating one or more separate permanent magnets into an assembly of different polarizations. Each magnet assembly may have a face with different polarizations wherein each polarization is provided by a separate magnet or a portion of a magnet. Also, the relative proportions of the different polarizations may vary, depending upon the particular application.

In the illustrated embodiment, the forces applied to the magnets 1570 are in the left/right (L/R) direction (depending upon the current direction) in FIGS. 3a, 3b, 6c, 6d. These forces cause tilting of the roller bearing 1510 about the pivot 1552. The force, exerted on the magnets 1570 is also known as the permeance force, and is similar to the force produced in stepper motors or brushless motors. A simulation indicates that the torque constant of the moving magnet actuator 1560 can be substantially larger, such as six times, for example, that of a corresponding moving coil actuator. It is believed that an actuator in accordance with this embodiment can have an increased torque per amp, to improve power dissipation, for a given disturbance environment.

In the illustrated embodiment, the magnet holder 1574 is rigidly attached to the magnets 1570, so that motion of the magnets 1570 is directly transmitted to the magnet holder 1574, bearing tracks 1555, and the barrel 1554. The motion of the magnet holder 1574 and the swing arm 1576 of the second support frame 1550 is constrained by the pivot at the pivot point 1552. The pivot 1552 rotates free of flexural tension and thus is not constrained by a flexural pivot such as a living hinge. In this embodiment, a restoring force to the untilted position is provided without a mechanical spring due to the magnetic attraction (permeance force) of the magnets 1570 to the magnet return path structure 1584.

In addition, the magnetic polarization of the magnets 1570, as shown in FIGS. 3b and 6c-d, allow a relatively pure torque to be developed substantially without a net force. Such an arrangement can reduce the force of constraint in the pivot 1552 and, it is believed, facilitate achieving improved dynamic response.

In the illustrated embodiment, to offset lateral forces which may be produced by the tape 11 due to tension, the pivot 1552 is placed at the midpoint of the barrel 1554 of the roller bearing 1510 as shown in FIG. 3a. Thus, the roller barrel surface 1556 has a center position 1590 in the lateral direction and the pivot axis defined by the pivot 1552 is aligned with the center position 1590. In another aspect of the present description, the center of mass of the moving part of the actuator 1560 may be positioned close to the pivot 1552 to alleviate effects due to external vibrations. It is appreciated that the pivot 1552 and actuator 1560 may be positioned in other positions, depending upon the particular application.

In another aspect of the present description, the voice coil actuator 1560 is sufficiently small to be self-contained within the body of the roller bearing 1510 itself, including its base 1520. Moreover, the roller bearing 1510, including the base 1520, has a form factor for ready implementation into various tape products. It is appreciated that in other applications, the size and position of the actuator, and the form factor of the roller bearing, may vary, depending upon the particular application.

Figure 7:
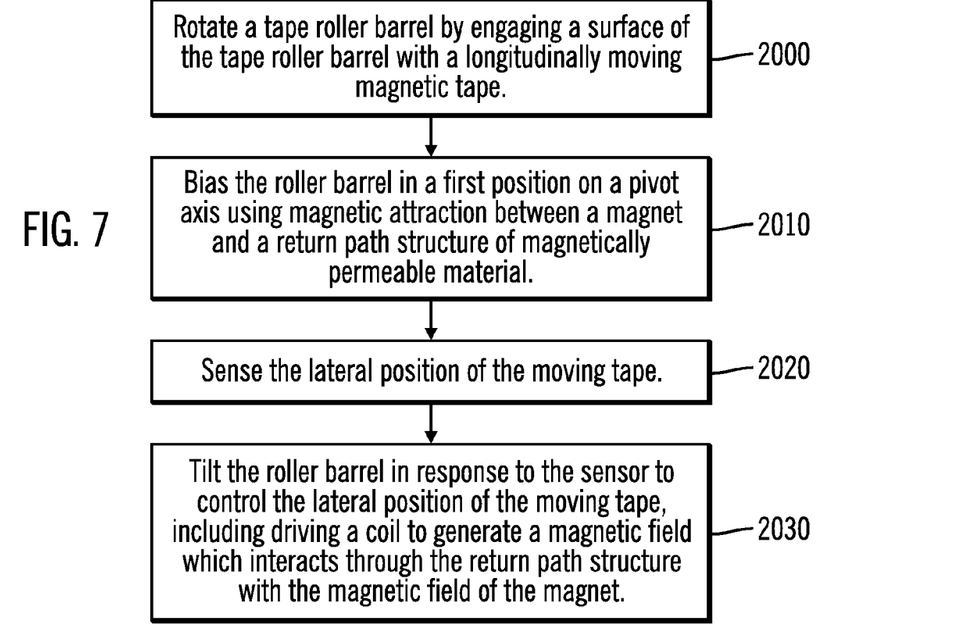
FIG. 7 is a flowchart depicting one example of operations of the tape constraint system of FIG. 3a, in accordance with the present description.

FIG. 7 depicts an example of operations, in accordance with one embodiment of the present description, to constrain lateral movement of a tape. In one operation, a tape roller barrel such as the roller barrel 1554 of the roller bearing 1510, is rotated (block 2000) by engaging a surface 1556 of the tape roller barrel 1554 with a longitudinally moving magnetic tape, such as the tape 11. In another operation, the roller barrel is biased (block 2010) in a first position on a pivot axis relative to a base support frame. In this embodiment, the first position is the nontilted position of the roller barrel relative to the longitudinal tape path as depicted in FIG. 3a. The magnetic attraction between a magnet such as the magnets 1570 and a return path structure of magnetically permeable material such as the structure 1584, is used to bias the roller barrel 1554 in the first, untilted position.

In one embodiment, at least a portion of any air bearing between the moving tape and the barrel surface may be quenched using grooves such as the grooves 1558, formed in the barrel surface 1556, so that the tape is constrained to move in the same direction as the tilting roller barrel.

Accordingly, in additional operations, the lateral position of the moving tape 11 is sensed (block 2020) by a sensor such as the sensor 324, and the rotating roller barrel is tilted (block 2030) using an actuator such as the actuator 1560, in response to the sensed lateral position of the moving tape, to control the lateral position of the moving tape. Thus, for example, if the sensor 324 senses the lateral position deviating from the center position, the actuator 1560 tilts the roller barrel 1554 which moves the tape back toward the center position. In this manner, deviation from the center lateral position of the tape relative to barrel center position may be readily corrected. It is believed that a tilting grooved roller bearing constraint as described herein has sufficient dynamics for closed loop operation.

Figure 8A:
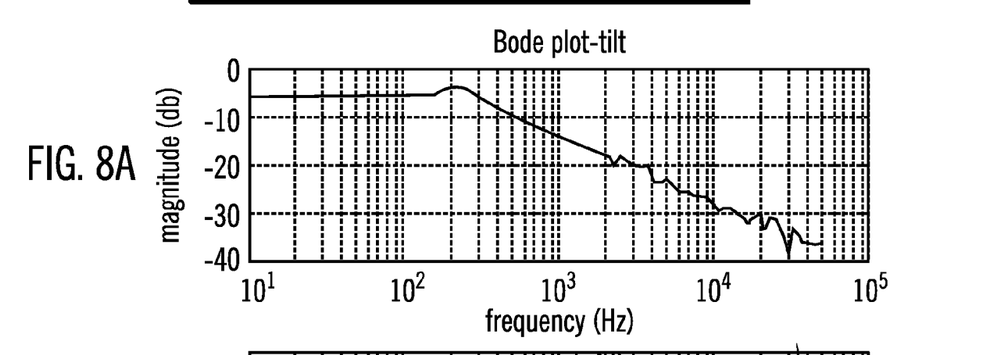
FIGS. 8a and 8b depict a simulation of one example of dynamics of operations of the tape constraint system of FIG. 3a, in accordance with the present description.
Figure 8B:
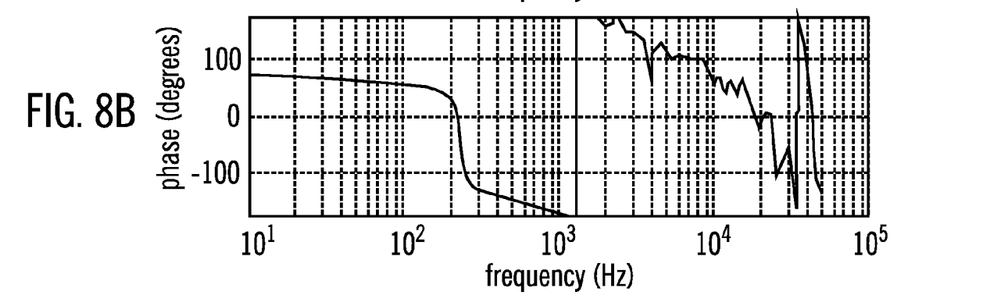

FIGS. 8*a* and 8*b* depict one example of a simulation of the dynamics of operation which it is believed may be obtained. FIG. 8*a* plots tilt magnitude versus frequency and FIG. 8*b* plots phase (in degrees) versus frequency, of the simulated dynamic operations. It is appreciated that other dynamic responses may be obtained, depending upon the particular application. The simulated transfer function shows a first resonance at 200 Hz and fairly clean dynamics beyond 10 kHz and is thus believed to be suitable for a tilt actuator such a low bandwidth tilt actuator, for example.

As noted above, the barrel surface 1556 may be textured, that is, grooved, to enhance lateral friction to a degree between the tape and the engagement surface 1556. It is recognized that a tilting grooved roller bearing, such as the roller bearing 1510, which quenches the air bearing between the tape 11 and the roller bearing 1510, does not, in this embodiment, operate in the same way as a tilting smooth roller which could permit an air bearing to be maintained between the tape 11 and the surface of the roller barrel. Because the air bearing is substantially quenched in the present embodiment, little or no tension gradient is developed across the tape. Nonetheless, tape 11 is constrained to move in the same direction as the tilting motion of the barrel of the grooved roller.

In one feature of a method of tape steering or guiding in accordance with one embodiment of the present description having a grooved or textured barrel surface, it is believed that there is little or no transition in control on startup. By comparison, such transitions in control may be present for a tilting smooth roller, such as during startup or shutdown. As a consequence, it is believed that, in a tape movement constraint in accordance with a grooved embodiment, effective control can be maintained at all or substantially all times to reduce or eliminate tape damage.

In another feature of a method of tape steering or guiding in accordance with the present description, it is believed that relatively little relative motion occurs between the tape and the grooved surface of the roller bearing, except that lateral motion intentionally caused by tilting the roller bearing. As a consequence, it is believed that high frequency lateral motion excitations may be controlled. In the illustrated embodiment, the cylindrical peripheral surface 1556 comprises a grooved frictional surface for contacting and engaging the surface of the tape and constraining movement of the tape in the lateral direction, while not increasing friction in the longitudinal direction, thereby reducing the rate of the lateral transient movement of the tape to allow the track following servo system to follow the reduced rate lateral transient movement of the longitudinal tracks.

Thus, the tape is contacted and engaged at its surface rather than at an edge, limiting lateral slip and providing substantial lateral drag to the tape, while the tape rolls freely with the tape roller bearing as the tape roller bearing rotates, substantially altering the transient characteristics of the tape and reducing the rate of the lateral transient movement. Thus, undesirable forces and stresses on the tape are reduced or prevented. At the same time, as the result of the substantial lateral drag provided by the lateral constraint of the grooved frictional cylindrical peripheral surface 1556, the rate of lateral movement is reduced. To move at a high lateral velocity, the tape would need to overcome the frictional contact of the cylindrical peripheral surface 1556. This constraint thereby substantially reduces the lateral velocity of the tape from that which would occur if the tape were free to slide over the bearing surface.

In yet another feature of a method of tape steering or guiding in accordance with the present description, it is believed that such method and apparatus may be readily used with a high wrap angle. By comparison, in the case of a smooth roller bearing, it is believed that a high wrap angle would tend to decrease the height of the self-acting air bearing, and thereby inhibit proper control operation of the smooth bearing.

Figure 9A:
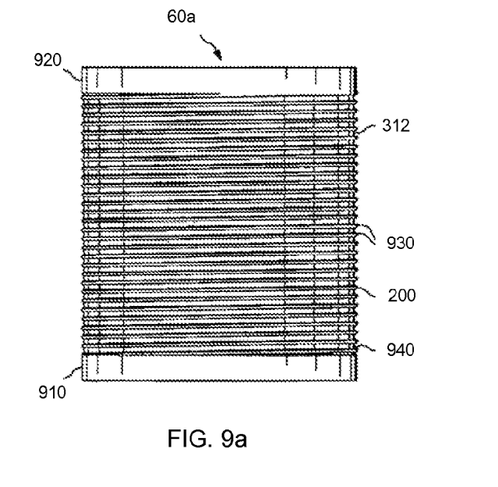
FIGS. 9a and 9b are enlarged views of alternative embodiments of the roller bearing barrel of FIG. 2.
Figure 9B:
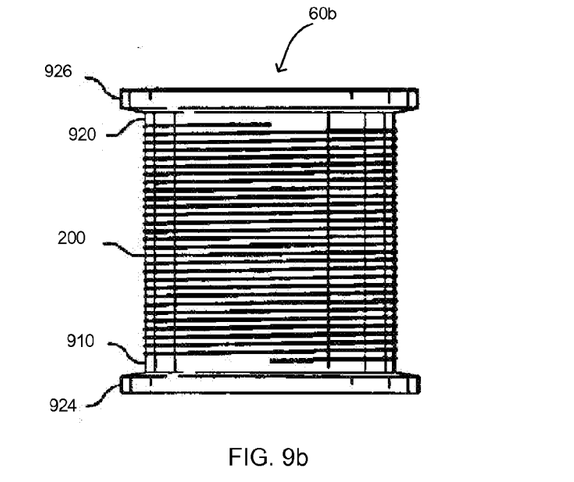

In the embodiment of FIGS. 2-6*d*, the cylindrical peripheral surface 1556 of the barrel 1510 is grooved with grooves 1558 over the full height L of the barrel 1510. FIGS. 9*a* and 9*b* show alternative embodiments of bearings 60, 60*b* in which a cylindrical peripheral surface 200 is ungrooved at each side of the grooves 312 at each edge of the tape to form smooth cylindrical surfaces 910 and 920 to fully support the tape at the edges. In the embodiment of FIG. 9*b*, the bearing 60*b* may further have flanges 924, 926 at the ends of the cylindrical surface 200 to further constrain lateral movement of the tape. The flanges 924, 926 are, thus, optional and may be provided to inhibit the tape from moving off the tape roller bearing when the tape tension is reduced or to reduce or eliminate excessive lateral movement of the tape due to axial misalignment of the tape roller bearing.

In some applications, the smooth support provided by smooth surfaces 910, 920 may tend to prevent distortion of the tape at the edges and to further prevent damage to the tape. Also, excessive amplitude lateral movement might be further inhibited by conventional tape guiding at adjacent locations.

In the embodiments of FIGS. 2-6*d* and 9*a*, 9*b*, the grooved portion of the tape roller bearing frictional cylindrical peripheral surface 200, 1556 comprises a plurality of lands 930 separated by grooves 312, 1558. The lands 930 extend about the cylindrical peripheral surface 200, 1556 in a circumferential direction generally parallel to the longitudinal direction that the tape is moved. Any potential air bearing that could form between the surface of the tape and the surface of the roller bearing, e.g., due to the air drawn along by the tape as it is moved rapidly, is collapsed to provide contact between the tape surface and the lands 930 for engaging the surface of the tape. In this example, the lands 930 and grooves 312, 1558 extend in the circumferential direction at an acute angle to the longitudinal direction, thereby forming a helical pattern. As an example, the lands may be as little as 30% of the combined width of a groove and land. The helical pattern of the frictional cylindrical peripheral surface extends laterally a length less than the width of a tape, to reduce or prevent generation of a trench into the surface of the tape by any one land, e.g., if the lands were non-helical. In order to reduce wear of the tape, the cylindrical peripheral surface lands 930 may be radiused 940 at the grooves 312, 1558. As an example, for lands of 0.10 mm, the radius may be less than 0.02 mm.

Figure 10:
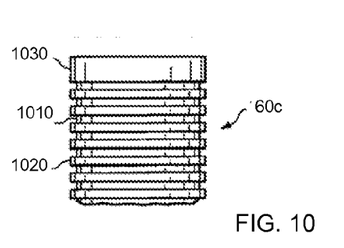
FIGS. 10-13 are enlarged views of alternative embodiments of the roller bearing barrel of FIG. 2.

FIG. 10 illustrates an alternative embodiment of a grooved roller bearing 60c in accordance with the present description, wherein the grooves 1010 and lands 1020 are substantially parallel to the longitudinal direction of the tape motion and a smooth cylindrical surface 1030 is provided at each edge of the bearing to support the tape edges.

Figure 11:
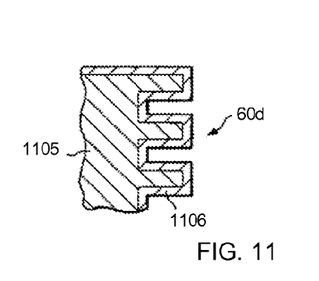

FIG. 11 illustrates a further alternative embodiment of a grooved roller bearing 60d. The roller bearing comprises a base material 1105, such as aluminum, coated with an elastomeric coating 1106 for engaging the tape. The coated roller bearing may appear the same as the helically grooved bearings of FIGS. 2-6d, 9a, and 9b, or as the longitudinally grooved bearing of FIG. 10. The elastomeric coating may have a high coefficient of friction. However, in many embodiments, the coating 1106 would typically not be "sticky" or cling to the tape, to allow the tape to move more freely in the longitudinal direction.

Figure 12:
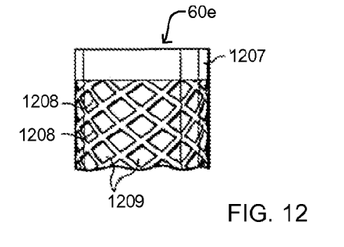
Figure 13:
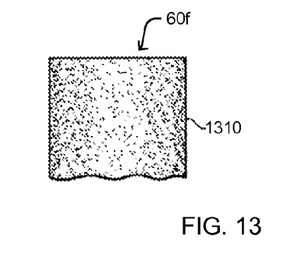

FIG. 12 illustrates two alternative embodiments of a roller bearing 60e in accordance with the present description. In a grooved peripheral surface, such as a machined set of grooves, the grooves 1208 extend in a double helix crossing pattern, such that the lands 1209 form islands for engaging the surface of the tape. In a textured surface of an elastomeric material, which may be molded, the textured surface may comprises a negative crosshatch "waffle" pattern of protruding islands 1209 above recessed grooves 1208, the protruding islands for contacting and engaging the surface of the tape, and the recessed grooves allowing entrapped air to bleed from between the tape and the cylindrical peripheral surface to collapse any air bearing thereat. A smooth cylindrical surface 1207 is provided at each edge of the bearing to fully support the tape edges.

Figure 14A:
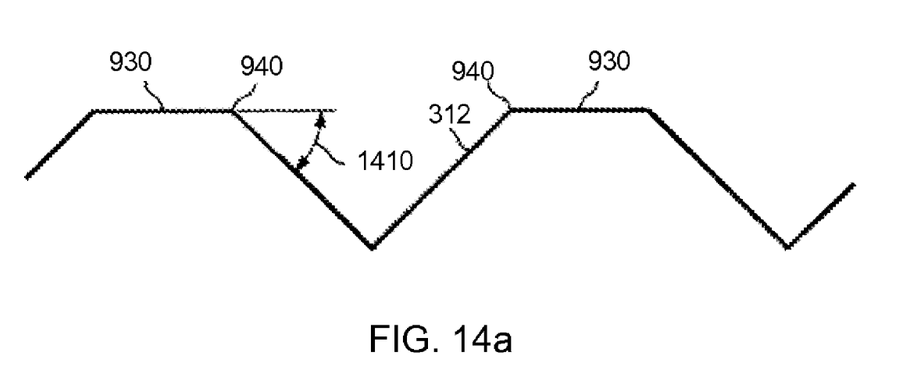
FIGS. 14a and 14b are diagrammatic representations of alternative embodiments of peripheral surfaces of the roller bearing barrel of FIG. 2 in accordance with the present description.
Figure 14B:
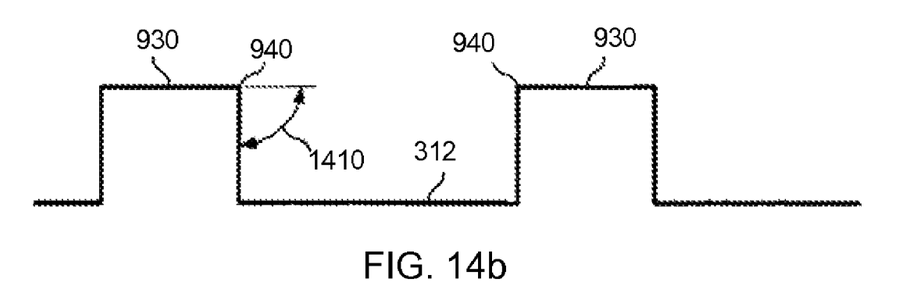

FIG. 14 illustrates a still further alternative embodiment of the present description, wherein the tape roller bearing frictional cylindrical peripheral surface 1410 comprises a roughened surface having protrusions for contacting and engaging the surface of the tape, and having grooves in the shape of amorphous, irregular voids allowing entrapped air to bleed from between the tape and the cylindrical peripheral surface to collapse any air bearing thereat. The roughened surface 1410 may be generated by sandblasting or by molding, for example. The surface 1410 is sufficiently supportive that a smooth surface at the tape edges may be omitted, thereby facilitating bleeding of air at the tape edges.

Referring to FIGS. 14a and 14b, the grooves 312 of the tape roller bearing may comprise any angle 1410 with respect to the lands 930, and any depth, that will assure that entrapped air is bled from between the tape and the cylindrical peripheral surface so as to collapse any air bearing. It has been found that appropriate angles comprise any angle in a range of substantially 45 degrees, as shown in FIG. 14a, to substantially 90 degrees, as shown in FIG. 14b. The tape roller bearing may be made, for example, from a metal, such as aluminum which is machined to form the respective lands and grooves. The radii 940 of the cylindrical peripheral surface lands 930 at the grooves 312 are also illustrated. Alternatively, the tape roller bearing may comprise a molded plastic or resin.

Those of skill in the art will understand that various materials and techniques may be employed to provide the roller bearing tape movement constraint of the present description. Those of skill in the art understand that still further alternative peripheral surfaces and techniques for manufacturing the tilting roller bearing may be envisioned.

While the preferred embodiments of the present description have been illustrated in detail, it should be apparent that modifications and adaptations to those embodiments may occur to one skilled in the art without departing from the scope of the present description as set forth in the following claims.

What is claimed is:

1. A tape movement constraint for a tape drive system for a tape, comprising:
a base having a first support frame;
a coil supported by said first support frame and adapted to conduct an electric current to generate a magnetic field wherein said first support frame includes a return path structure formed of a magnetically permeable material, and positioned adjacent said coil to conduct said magnetic field generated by said coil;
a second support frame pivotally coupled to said first support frame;
a first permanent magnet supported by said second support frame wherein said magnet is positioned facing said return path structure; and
a tape roller barrel rotatably supported by said second support frame, said roller barrel being positioned along a tape path;
wherein magnetic attraction between said magnet and said return path structure biases said second support frame and said roller barrel in a first position relative to said first support frame and wherein current conducted through said coil generates a magnetic field which is conducted by said return path structure to interact with the magnetic field of said magnet which causes said second support frame and said roller barrel to pivot relative to said first support frame as a function of the magnitude and direction of said current through said coil.

2. The constraint of claim 1 wherein said tape drive system is adapted to move said tape along said tape path in a longitudinal direction across a tape head, said tape having tracks extending in said longitudinal direction, said tape subject to transient movement in a lateral direction with respect to said longitudinal direction, said constraint further comprising:
a tape position sensor positioned to detect the lateral position of the tape; and
a controller responsive to the tape position sensor and adapted to control the current through said coil to tilt the roller barrel to control the lateral position of the tape in response to the tape position sensor.

3. The constraint of claim 2 wherein said roller barrel has a grooved surface adapted to contact and engage a surface of the tape as said roller barrel rotates.

4. The constraint of claim 1 further comprising a second permanent magnet supported by said second support frame wherein said second magnet is positioned facing said return path structure and wherein said second support frame is pivotally coupled to said first support frame at a pivot point located between the first and second magnets.

5. The constraint of claim 1 wherein said second support frame includes a magnet holder adapted to hold said magnet, said constraint further comprising a roller bearing track positioned around and supported by said magnet holder and engaging said roller barrel, wherein said roller barrel is adapted to rotate on said roller bearing track around said magnet holder of said second support frame.

6. The constraint of claim 4 wherein said second support frame includes a magnet holder adapted to hold said first and second magnets, said constraint further comprising first and second roller bearing tracks positioned around and supported by said magnet holder and engaging said roller barrel with said pivot point located between said first and second roller bearing tracks, wherein said roller barrel is adapted to rotate on said roller bearing tracks around said magnet holder of said second support frame.

7. The constraint of claim 4 wherein said roller barrel has a center position in a lateral direction and said pivot point defines a pivot axis aligned with said center position.

8. The constraint of claim 6 wherein said return path structure formed of a magnetically permeable material includes a core around which said coil is wound, and first and second parallel members, each member being disposed at an end of said core, said permanent magnets and said magnet holder extending between said members of said return path structure.

9. The constraint of claim 6 wherein each roller bearing track defines an interior opening, and wherein said return path structure formed of a magnetically permeable material includes a core around which said coil is wound, and first and second parallel members, each member being disposed at an end of said core, and extending through the openings of said roller bearing tracks, said permanent magnets and said magnet holder extending between said members of said return path structure.

10. The constraint of claim 9 wherein said second support frame structure includes a swing arm extending around said first support frame and having two ends, each end being pivotally coupled to said first support frame, said magnet holder being coupled to said swing arm to pivot with said swing arm.

11. The constraint of claim 10 wherein each magnet has a face facing said magnetic return structure, each face being divided into portions of opposite magnetic polarity.

12. The constraint of claim 10 further comprising first and second magnet assemblies, each magnet assembly having a plurality of magnets and a face facing said magnetic return structure, each face being divided into portions of opposite magnetic polarity wherein said first magnet assembly includes said first permanent magnet and said second magnet assembly includes said second permanent magnet.

13. A method, comprising:
rotating a tape roller barrel by engaging a surface of the tape roller barrel with a longitudinally moving magnetic tape;
biasing said roller barrel in a first position on a pivot axis relative to a base support frame, using magnetic attraction between a first permanent magnet and a return path structure of magnetically permeable material wherein said magnet is coupled to said roller barrel and said return path structure is coupled to said base support frame;
sensing the lateral position of the moving tape; and
tilting the rotating roller barrel on said pivot axis relative to said base support frame in response to the sensed lateral position of the moving tape to control the lateral position of the moving tape, said tilting including conducting current through a coil to generate a magnetic field which is conducted by said return path structure to interact with the magnetic field of said magnet which causes said roller barrel to pivot on said pivot axis as a function of the magnitude and direction of said current through said coil.

14. The method of claim 13 further comprising quenching at least a portion of any air bearing between the moving tape and the barrel surface using grooves formed in the barrel surface.

15. The method of claim 13 wherein said coil of said current conducting is at least partially disposed within said roller barrel.

16. The method of claim 15 wherein said rotating includes using a roller bearing track positioned around and supported by a magnet holder adapted to hold said magnet and engaging said roller barrel, wherein said roller barrel is adapted to rotate on said roller bearing track around said magnet holder in response to engagement of the surface of the tape roller barrel with the longitudinally moving magnetic tape.

17. The method of claim 13 wherein said pivot axis is aligned with a center position of said roller barrel surface in a lateral direction.

18. The method of claim 13 wherein said biasing further includes using magnetic attraction between a second permanent magnet and said return path structure of magnetically permeable material wherein said second magnet is coupled to said roller barrel and wherein said tilting further includes conducting current through said coil to generate a magnetic field which is conducted by said return path structure to interact with the magnetic field of said second magnet which causes said roller barrel to pivot on said pivot axis located between said first and second magnets, as a function of the magnitude and direction of said current through said coil.

19. The method of claim 18 wherein each magnet has a face facing said return path structure, each face being divided into portions of opposite magnetic polarity.

20. The method of claim 18 wherein said first and second magnets are assembled into first and second magnet assemblies, respectively, each magnet assembly having a plurality of magnets and a face facing said magnetic return structure, each face being divided into portions of opposite magnetic polarity.

* * * * *